(12) United States Patent
Frederick

(10) Patent No.: US 8,662,754 B1
(45) Date of Patent: Mar. 4, 2014

(54) DAMPED AIR BEARING

(75) Inventor: Gary L. Frederick, Byron, IL (US)

(73) Assignee: Fluidic Microcontrols, Inc., Savanna, IL (US)

( * ) Notice: Subject to any disclaimer, the term of this patent is extended or adjusted under 35 U.S.C. 154(b) by 42 days.

(21) Appl. No.: 12/758,753

(22) Filed: Apr. 12, 2010

(51) Int. Cl.
*F16C 32/06* (2006.01)
*F16C 17/10* (2006.01)
*F16C 3/16* (2006.01)

(52) U.S. Cl.
USPC ............ 384/121; 384/109; 384/317; 384/320

(58) Field of Classification Search
USPC ........... 384/12, 100, 108–109, 308, 317, 320; 310/51, 68 R, 90, 90.5
See application file for complete search history.

(56) References Cited

U.S. PATENT DOCUMENTS

| | | | | |
|---|---|---|---|---|
| 2,928,084 A | * | 3/1960 | Ashby et al. ................... | 342/190 |
| 5,126,610 A | * | 6/1992 | Fremerey ...................... | 310/90.5 |
| 5,736,798 A | * | 4/1998 | O'Brien et al. ................. | 310/51 |
| 6,280,126 B1 | * | 8/2001 | Slocum et al. ............ | 408/239 R |
| 6,629,471 B2 | * | 10/2003 | Uchimi ....................... | 74/490.09 |
| 2003/0113043 A1 | * | 6/2003 | Uchimi ........................... | 384/12 |

FOREIGN PATENT DOCUMENTS

| | | | | | |
|---|---|---|---|---|---|
| JP | 2002276660 A | * | 9/2002 | .............. | F16C 32/06 |
| JP | 2003028973 A | * | 1/2003 | ............... | G12B 5/00 |

\* cited by examiner

*Primary Examiner* — Marcus Charles
(74) *Attorney, Agent, or Firm* — Reinhart Boerner Van Deuren P.C.

(57) ABSTRACT

An air or gas bearing supports a moving mass on a thin column of gas which is partially constrained in a pressurized cavity. The gas to the cavity is supplied through a fluidic amplifier. Pressure in the thin supporting column above the bearing pad, or the position of the mass surface relative to the open end of the pressurized cavity, is sensed. The resulting feedback pressure signal is dynamically compensated to produce a pressure signal to the input ports of the fluidic amplifier which is a function of the velocity of the mass. The compensation network consists of orifices, or flow resistors, and volume cavities, or compressible fluid capacitors. The compensated feedback pressure is amplified by the fluidic amplifier to provide an output pressure to the bearing cavity which is indicative of and nearly proportional to the mass velocity perpendicular to the bearing pad and achieve a high degree of damping without use of extremely small orifices or complicated electromechanical damping means.

15 Claims, 5 Drawing Sheets

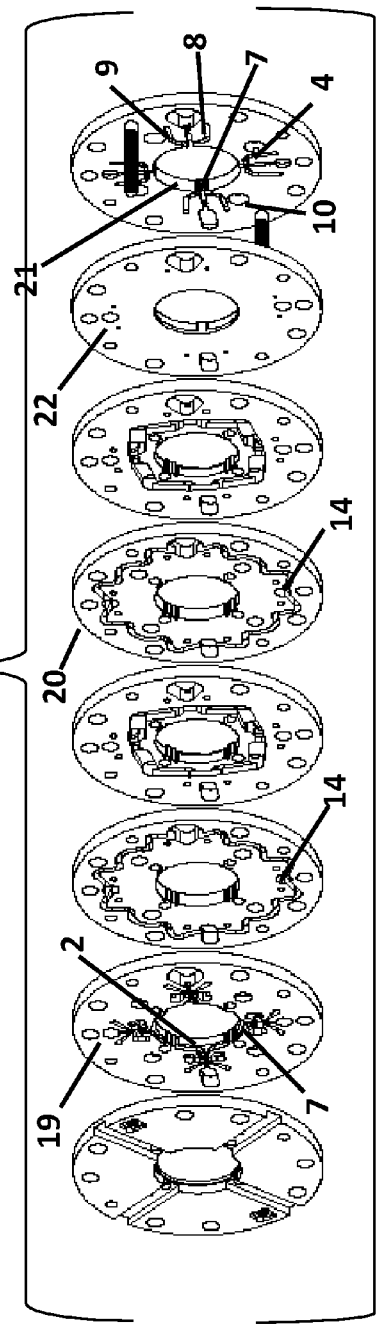
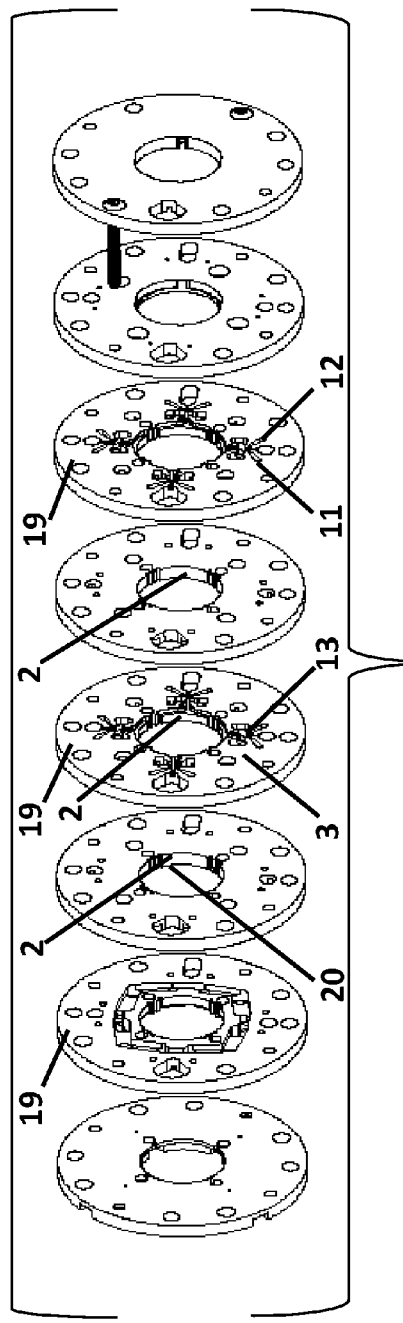
Fig. 5A
Fig. 5B

US 8,662,754 B1

DAMPED AIR BEARING

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

FIELD OF THE INVENTION

This invention relates to aero-static gas bearings and, particularly, how to greatly improve the damping characteristics of these bearings by utilizing compensated fluidic amplifiers to pressurize the bearing pads.

BACKGROUND OF THE INVENTION

Aero-static gas bearings use a thin layer of pressurized gas between surfaces to allow relative movement with virtually no friction. This layer of gas is typically only 5 to 25 microns deep. The area of the pad is sized to keep the surfaces separated under their weight and external loads when pressurized. The resulting bearing stiffness is proportional to the energizing pressure supplied to the bearing pad and inversely proportional to the square of gas film depth between the surfaces. A variety of methods have been utilized to evenly distribute the lifting pressure across the pad by utilizing a pattern of small orifices, porous media, and various groove geometries machined into the pad surfaces. Some of these are described in the following patents and all impact the resulting damping that may be realized: Saulgot et al, U.S. Pat. No. 3,698,774; Ida, et al., U.S. Pat. No. 4,392,751; Klein et al., U.S. Pat. No. 4,521,121; Stauber, U.S. Pat. No. 4,558,909; Fleury et al., U.S. Pat. No. 6,505,698

Damping of gas bearings has typically been derived from the inherent force created from squeezing the viscous gas between the small gaps between the bearing pad and surface of the supported member or by adding coulomb friction, which adds to bearing wear and drag. Although resulting damping coefficients are better than for purely mechanical bearings without friction or liquid dampers, damping ratios as a result of squeeze film damping are typically well under 10% and decrease inversely proportional to the cube of the gap or the amplitude of the relative motion. This damping is nearly ineffective for gaps greater than 25 microns, where it is often required to operate in high speed rotating machinery design. The result is resonances or instability in the air bearing suspension system.

The squeeze film damping also changes with gas temperature and associated change in gas viscosity. Various techniques have been used to adjust the gaps to control damping ratios, but maximum achievable damping is still limited. Applications requiring more damping, such as hard drives, utilize active control techniques with electronic position sensing, piezo-actuator adjustment of gaps, and digital electronic control. However, these techniques are complicated and are not robust enough for industrial automation or high speed rotating machinery applications. Foil bearings rely on coulomb friction from support springs to provide limited damping, but the resulting damping decreases for increasing excursion amplitudes.

SUMMARY OF THE INVENTION

The objective of this invention is to provide air bearings with greatly increased damping, which also then results in improvements in air bearing stiffness and overall positioning system accuracy. In the improved bearing, the air bearing support pad is connected to an output port of a fluidic beam deflection amplifier. The beam deflection amplifier includes a power jet issuing from a nozzle pressurized by an external supply source, a pair of input control ports which create jets at right angles to the power jet such as to deflect the power jet by transfer of momentum, a vented interaction region, and a pair of output ports with a differential output pressure (between the output ports) proportional (i.e., is a function of, and indicative or representative of; approximately proportional, and preferably proportional) to the differential control port pressure (between the control ports). The bearing pad pressure (between the bearing pad and the suspended mass) is proportional to pressure out of the fluidic amplifier positive port and inversely proportional to the gap between the supported body and the bearing pad skirt. The amplifier supply port is pressurized by the external source of supply pressure to create a pressure at the output port to energize (pressurize) the bearing pad, not requiring contamination-sensitive small orifices or porous media to distribute pressurized gas across the surface of the bearing pad. Increased damping is provided by creating pressure signals to the input control ports of the fluidic amplifier which deflect the supply power jet as a function of the velocity of the suspended body. For applications requiring maximum damping, the supply jet centerline is symmetrical to the two output ports to allow for maximum pressure swing. For applications requiring maximum load carrying ability, the supply jet centerline can be offset by approximately one quarter of a jet width toward the positive output port to maximize pressure to the bearing pad.

In one preferred embodiment, the bearing pad pressure is used directly to sense body position and velocity. This is most readily done by sensing and scaling the bearing pad pressure through a pair of identical flow resistors, or restrictors, which are typically nozzles. These flow restrictors are in turn connected to the control ports of the fluidic amplifier, one to the positive port and one to the negative port. The nozzle connected to the negative port also feeds a volume capacitor which attenuates the effect of pad pressure changes. For $R_1$ as the fluid resistance of the flow restrictors, $R_2$ as the fluid resistance of the amplifier control ports, and $C_v$ as the fluid capacitance of the volume capacitor, $dP_{damping}$ as the differential change in damping pressure supplied to the bearing pad, and $dP_{pad}$ as the differential change in pressure in the bearing pad, the transfer function of the network is $dP_{damping}/dP_{pad} = R_2/(R_1+R_2)*(\tau s/(1+\tau s))$, where $\tau = C_v R_1 R_2/(R_1+R_2)$. This shows a differentiating term in the numerator to provide the additional rate, or damping term and achieve increased damping in the air bearing supported system. The filtered pad pressure control signal in the branch containing the volume capacitor provides the input to the negative control port of the fluidic amplifier. The pressure control signal from the unfiltered side is fed directly from the other flow restrictor to the positive control port of the fluidic amplifier. As pad pressure and suspended mass velocity change, the resulting differential signal to the amplifier control ports cause the power jet to deflect as it traverses the amplifier vent interaction region. This creates a pressure change at the amplifier output port connected to the bearing pad. This pressure change, acting on the bearing pad area, creates a damping force to resist movement of the mass. The flow resistor and volume capacitor sizes can be selected to maximize damping at the mass system natural frequency.

In a second embodiment, position of the suspended mass relative to the bearing pad is also sensed by an independent system of flapper nozzle valves, where a surface of the suspended body may be used as the flapper. The position sensing valve is supplied by a control orifice from a fixed, external gas supply to provide air flow into the valve. The nozzle for the valve is typically a circular or rectangular skirt which is located to provide a small gap and annular area with respect to the surface of the suspended body. As the body moves toward the nozzle and decreases the annular exhaust area, intermediate pressure increases toward the value of the control orifice supply pressure. Similarly, as the body moves away from the nozzle, the sensor pressure decreases and is a direct representation of relative body position. The position sensor pressure is used in addition to the bearing pad pressure as the feedback signal into the compensating circuit. The pressure signal from the position sensor is summed with the pad pressure feedback signal through a second set of resistors. The ratio of the pressure feedback and position feedback scaling resistors may be selected to tune a bearing system for maximum stability. In addition, the flapper/nozzle may be offset relative to the centerline of the bearing pad. This can provide phase lead for added damping in high speed rotating systems to further suppress shaft whirl. Added bearing stiffness may be achieved by making the compensating circuit orifice to the positive amplifier control port larger than the compensating circuit orifice to the negative control port. This creates a differential amplifier input signal which is a function of both body position and velocity. This embodiment is particularly useful in radial bearing systems supporting rotating shafts where the asymmetrical differential position signal to the amplifier may be used to suppress shaft runout errors.

The fluidic control circuit components, interconnecting porting, and pad design features which comprise the active fluidic bearing may be integrated and precision machined onto both sides of laminates which contain the desired bearing form factor for either flat or radial bearing designs. Features such as needle valves and movable plugs may be added to allow selection of the feedback orifice and volume sizes to optimize bearing damping and stiffness at the supported mass natural frequency, or for any other desired system operating parameters.

BRIEF DESCRIPTION OF THE DRAWINGS

FIGS. 5A and 5B are exploded perspective views showing a four-quadrant radial bearing with compensated position feedback.

Figure 1:
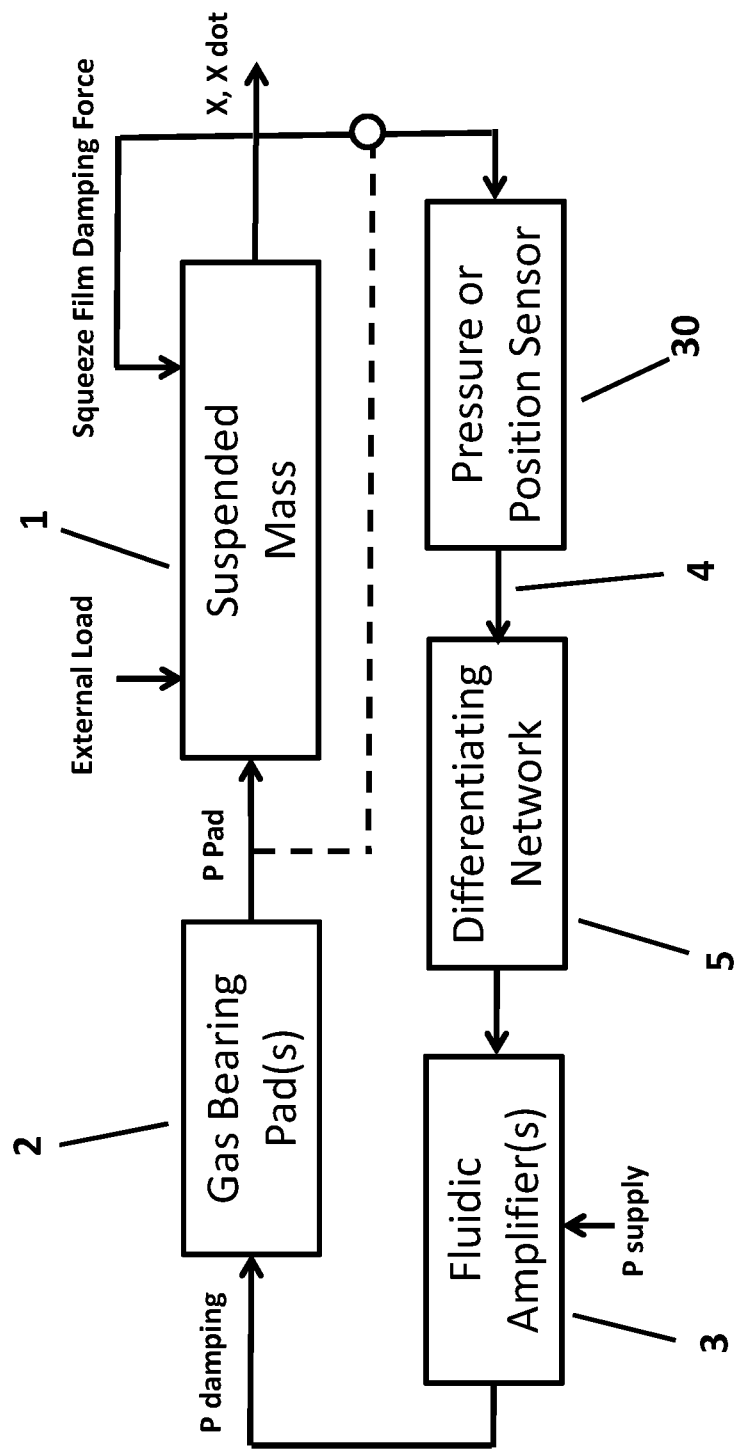
FIG. 1 is a block diagram of a gas bearing damped by fluidic amplifiers.

While the invention is susceptible of various modifications and alternative constructions, certain embodiments are shown in the drawings and described in detail below. It should be understood, however, that there is no intention to limit the invention to the specific forms disclosed, but on the contrary, the intention is to cover all modifications, alternative constructions and methods, and equivalents falling within the spirit and scope of the invention.

DETAILED DESCRIPTION OF THE INVENTION

The actively damped air bearing invention is best described referring to the drawings, wherein the same reference numerals are used identify the same elements throughout the drawings. Air bearings of the subject type are closed loop devices, and, if under damped, are unstable or oscillatory over the desired operating range.

FIG. 1 is a block diagram showing the elements of a closed loop air bearing with the addition of active fluidic damping. The system includes the mass 1 and external forces or loads on the object to be suspended on the pressurized area of bearing pad 2. The bearing pad 2 is pressurized by the output pressure (P damping) from a beam deflection fluidic amplifier 3 which is powered with a supply pressure (P supply) from an external source of pressurized gas. The output pressure (P damping) of the fluidic amplifier 3 is proportional to the differential pressure signal (P amp-in) applied across its input control ports. A feedback signal 4 to achieve active damping in the bearing can be obtained by a sensor 30, by directly sensing the pressure (P pad) in the bearing pad 2 and by sensing the position (X) of the suspended mass 1 relative to the bearing pad 2. This feedback signal is shaped by a passive pneumatic differentiating network 5 and ported to the control input ports of fluidic amplifier 3 to create a change in output pressure (dP damping) which is a function of the velocity (X dot) of the suspended mass 1 with respect to the bearing pad, acting through the area of the bearing pad 2 to create an additional damping force on the suspended mass 1.

Figure 2:
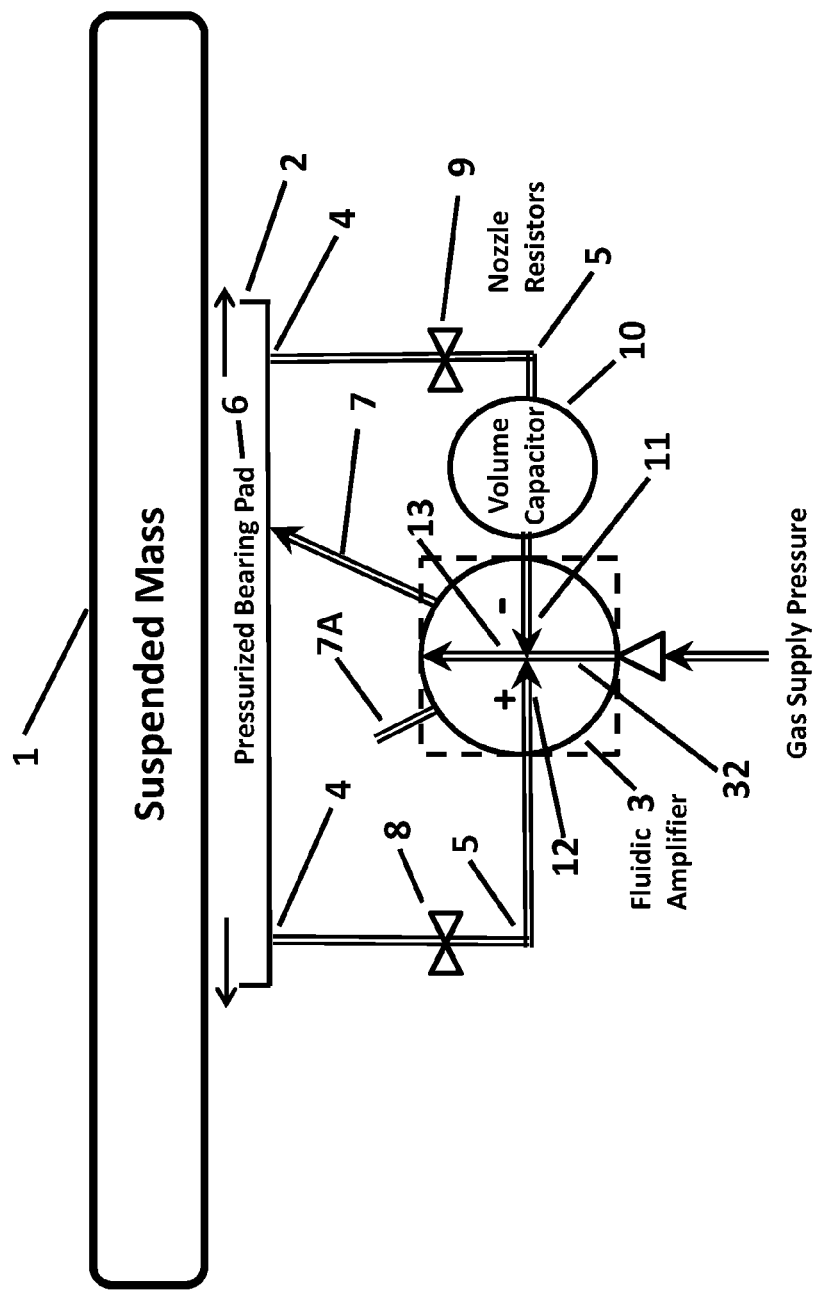
FIG. 2 is a schematic drawing of a fluidically damped bearing with pad pressure feedback.

FIG. 2 is a schematic of the preferred fluidically damped air bearing embodiment utilizing bearing pad 2 pressure feedback 4 to achieve controlled damping of the suspended mass 1. The bearing pad pressure (P pad) 6 is sensed at a port in the bearing pad 2 or at the positive output port 7 of fluidic amplifier 3. Bearing pad pressure 6 is then connected to two identical fluid restrictors 8 and 9 which form the input to differentiating network 5. A volume capacitor 10 works in conjunction with fluid restrictor 9 to provide lag filtering of the pad pressure 6 signal which drives the negative input control port 11 of fluidic amplifier 3. The positive input control port 12 is driven directly by the reduced pad pressure 6 signal from fluid resistor 8. A power jet 13 is formed by the gas supply pressure and supply nozzle 32 at right angles to the input control ports 11 and 12. For applications requiring maximum damping, the supply jet 32 centerline is symmetrical to the two output ports 7, 7A of the fluidic amplifier 3 (as shown in FIG. 2) to allow for maximum pressure swing in the damping pressure. For applications requiring maximum load carrying ability, the supply jet 13 centerline can be offset by approximately one quarter of a jet width toward the positive output port 7 to enable maximizing pressure to the bearing pad. The jet 13 is deflected by the differential pressure across input control ports 11 and 12 to cause the output pressure at positive amplifier output port 7 to increase as velocity of the suspended mass 1 increases (and to cause the output pressure at positive amplifier output port 7 to decrease as velocity of the suspended mass 1 decreases). This produces a damping force on the suspended mass 1.

Figure 3A:
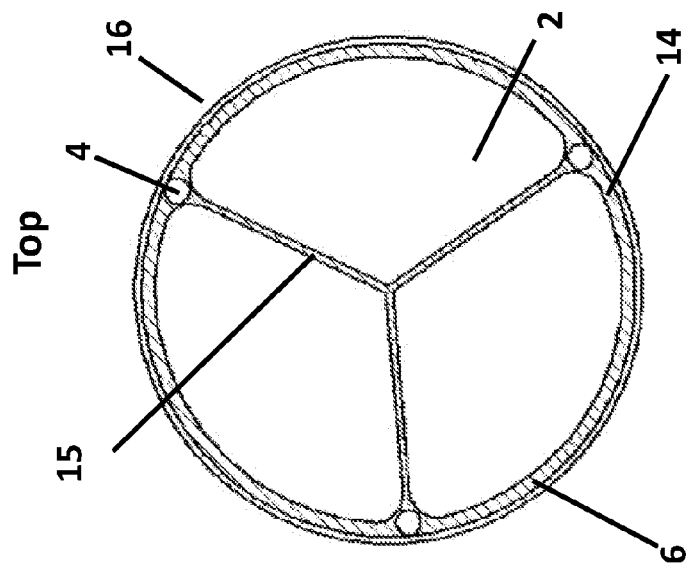
FIGS. 3A and 3B are top and bottom plan views of a damped bearing pad laminate with pad pressure feedback.
Figure 3B:
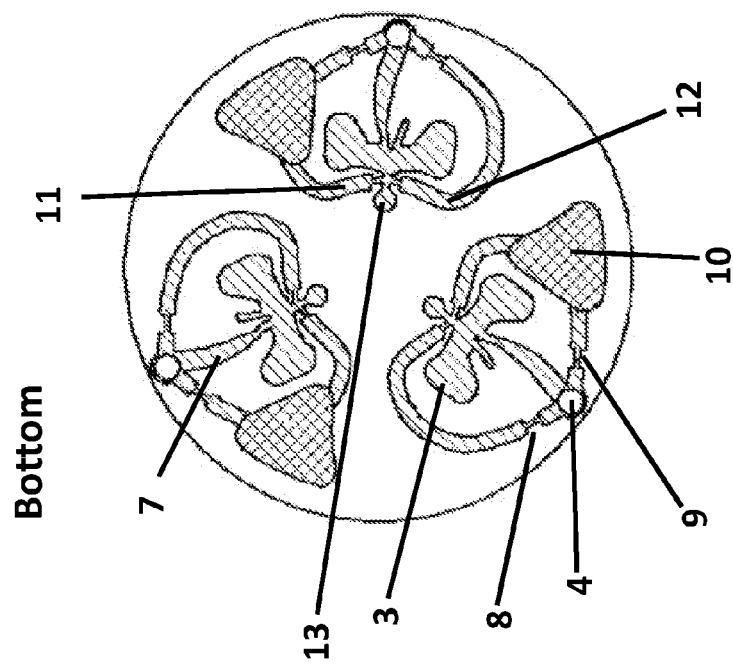

FIGS. 3A and 3B are top and bottom plan views of a damped bearing pad laminate 16 with pad pressure feedback. The top view (FIG. 3A) shows the bearing pad 2, which has a flat surface configured to support a translating mass. The pad has multiple pressure inputs 4 through the laminate to provide uniform lift and angular stability of the suspended mass. The bearing pad input pressures 4 are manifolded into a common circumferential channel, or moat 14 in the top surface of the laminate. Bearing pad pressure 6 is made further uniform by averaging channels 15 in the face of the bearing pad 2. The amplifier and differentiating network features are formed into the bottom surface of the laminate, as shown on the bottom view (FIG. 3B). The bearing pad 2 is energized by one or more fluidic amplifiers 3. The differentiating network includes fluid resistors 8 and 9 and volume capacitor 10. The fluidic amplifier 3 includes a supply jet 13, control jets 11 and 12, and active output port 7, which is connected to the flow resistors 8 and 9 and bearing pad cavity which contains bearing pad pressure 6. As the mass 1 moves closer to the bearing pad 2 surface (with the bearing pad laminate operating in an air bearing suspending mass 1), bearing pad pressure 6 increases, the differential pressure out of the compensating network 5 (i.e., the differential pressure across fluid restrictors 8 and 9) changes with, or is a function of, changes in mass 1 velocity and is fed to the input control ports 11 and 12 of fluidic amplifier 3. The differential momentum from the flows from the input control ports 11 and 12 causes the jet from the amplifier output port 7 to deflect as a function of velocity of the suspended mass, changing the pressure 6 in the bearing pad 2 to provide the required damping force on the suspended mass. The fluidic control circuit and interconnecting porting is precision machined onto both sides of the pad laminate 16. FIG. 3A shows a preferred embodiment of the pad 2 which breaks the pad surface into 3 separate sub-pads, each fed by its own compensated fluidic amplifier. This provides for a tripod effect and provides for ability of the overall bearing to seek its own level relative to the uneven or out of parallel surface it is riding upon.

Figure 4:
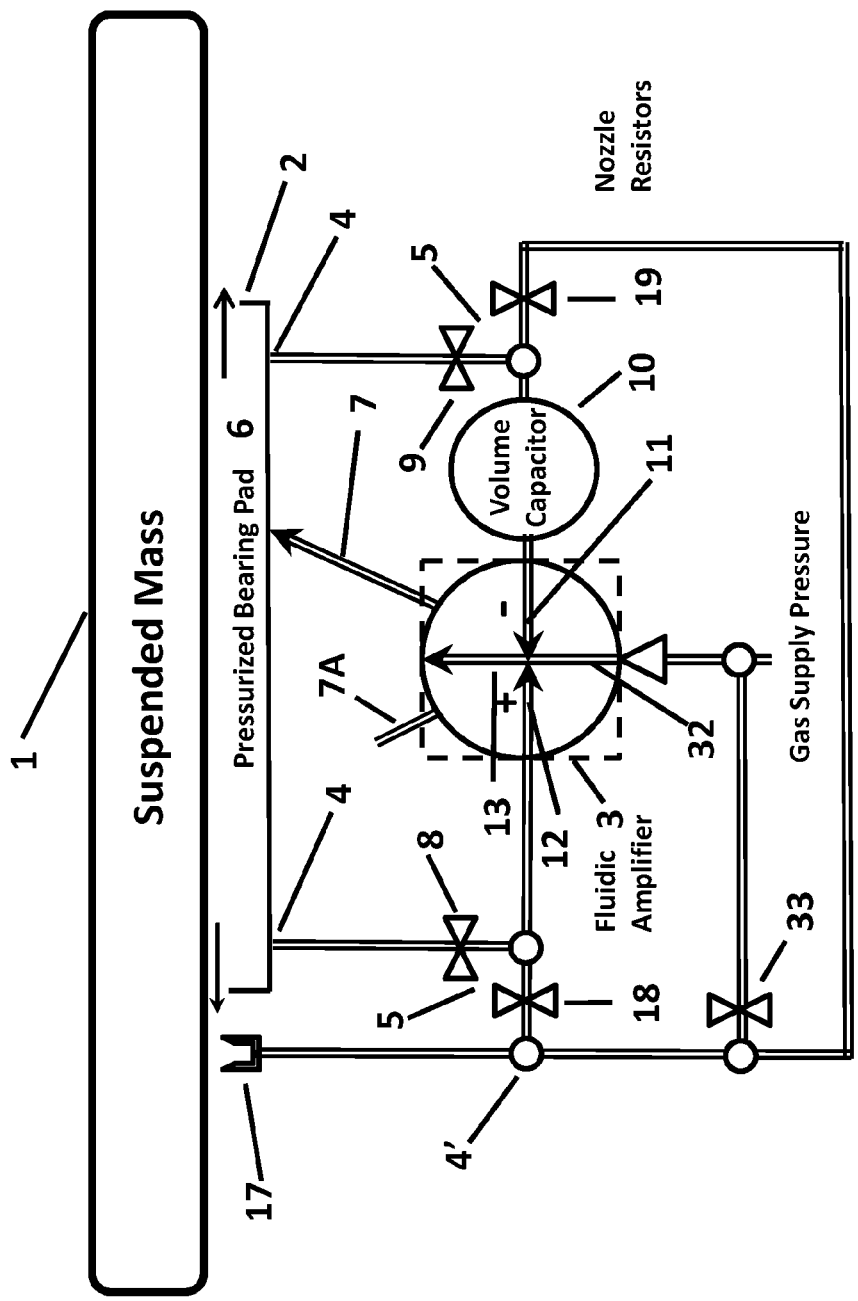
FIG. 4 is a schematic drawing of a fluidically damped bearing with pad pressure feedback and flapper/nozzle position sensor feedback.

FIG. 4 is a schematic drawing of a second embodiment of the fluidically damped bearing which utilizes an independent position sensor to create an additional position feedback signal 4' indicative or representative of the position of the suspended mass 1 with respect to the bearing pad. The position sensor shown is comprised of a flapper-nozzle 17, control orifice 33, and summing orifices 18 and 19. The control orifice 33 is connected to a fixed external gas supply to provide flow into the flapper/nozzle position sensor. The nozzle 17 is typically a circular or rectangular skirt which is located to provide a small gap and annular area with respect to the surface of the suspended body 1, which may be used directly as the flapper to modulate flow from the nozzle 17. As the body 1 moves toward the nozzle 17 and decreases the annular exhaust area between the nozzle and the body, intermediate pressure 4' increases toward the value of the control orifice supply pressure. Similarly, as the body 1 moves away from the nozzle 17 and increases the annular exhaust area between the nozzle and the body, the sensor pressure 4' decreases, and is a direct representation of relative body position. The position sensor pressure 4' may be used in place of, or in addition to, the bearing pad pressure 6 as the feedback signal into the compensating circuit 5. For implementing added damping only, the differentiating compensation circuit 5 flow summing resistors 8 and 9 are typically identical in size and flow summing resistors 18 and 19 are also identical in size. These form the input resistances to differentiating network 5. A volume capacitor 10 works in conjunction with fluid restrictor 9 to provide lag filtering of the pad pressure 6 signal which drives the negative input control port 11 of fluidic amplifier 3. The positive input control port 12 is driven directly by the reduced pad pressure 6 signal. A power jet 13 is formed by the gas supply pressure and supply nozzle at right angles to the control ports 11 and 12. The jet 13 is deflected by the differential pressure across control ports 11 and 12 to cause the output pressure at positive amplifier output port 7 to increase as velocity of the suspended mass 1 increases. This produces a damping force on the suspended mass 1.

FIGS. 5A and 5B are exploded views showing a four-quadrant radial air bearing with compensated position feedback including the corresponding elements described above. This shows a preferred method for manufacturing integrated fluidic circuit components onto micro-machined laminates which are precisely stacked and fastened together to achieve functionality of the bearing. One side of the laminates is shown in FIG. 5A, and the other side of the laminates is shown in FIG. 5B. An amplifier laminate plate 19 shows four fluidic amplifiers 3 which energize four independent, orthogonal (radial) bearing pads 2 with pressurizing moats 14 on integrated laminate 20. Three radial amplifier laminate plates 19 are shown with a manifold plate 20 between the amplifier plates, with bearing pads 2 on all laminate. This embodiment is particularly useful in radial bearing systems, supporting rotating shafts extending through the centers of the laminates, where the asymmetrical differential position signals 4 to the amplifiers 3 may be used to suppress shaft runout errors. The orthogonal flapper/nozzle shaft position sensors are located in a common laminate 21 that directly senses shaft movement and runout in orthogonal radial axes. Fluid restrictor components for the four-channel compensating circuits are shown in RC filter laminate plate 22.

The invention claimed is:

1. A damped air bearing for supporting a body in linear and rotating applications, comprising:
   a) a beam deflection proportional fluidic amplifier with a supply port pressurized from an external air pressure source and providing an amplifier supply jet, an output port supplying an amplifier output pressure, and a pair of input control ports;
   b) a bearing pad connected to the amplifier output port and pressurized by the amplifier output pressure to support said body on a film or layer of pressurized gas;
   c) a passive fluidic compensation circuit connected to sense the pressure in said bearing pad; and
   d) a pneumatic compensation circuit operative to generate a differential pressure which varies with the rate of change of the sensed bearing pad pressure;
   e) said compensation circuit being connected across the input control ports to cause a deflection of the amplifier supply jet and a change in amplifier output pressure as the sensed bearing pad pressure changes.

2. The damped air bearing as defined in claim 1 wherein the input control ports include a positive input control port opposite the output port, and the passive fluidic compensation circuit comprises a fluid nozzle or flow restrictor connecting the positive input control port to the bearing pad pressure.

3. The damped air bearing as defined in claim 2 wherein the input control ports further include a negative input control port, and the passive fluidic compensation circuit further comprises a second fluid nozzle or flow restrictor and a fluid capacitor volume connecting the negative input control port to the bearing pad pressure.

4. The damped air bearing as defined in claim 3 wherein the fluid capacitor volume is configured to maximize the damping ratio to the natural frequency of the bearing and its supported load.

5. The damped air bearing as defined in claim 1 further comprising a second output port, and wherein the supply jet centerline of the beam deflection amplifier is offset from the centerline of the output ports to maximize the flow through the output port to the bearing pad.

6. The damped air bearing as defined in claim 1 further comprising a grooved channel, or moat, surrounding the bearing pad and connected to the output port of the fluidic amplifier to distribute the amplifier output pressure around the bearing pad.

7. The damped air bearing as defined in claim 6 wherein the bearing pad includes a smooth, discrete, inner island of surface area provided with equal pressure from the moat to maximize the area for squeeze film damping and to allow a uniform lifting pressure distribution.

8. The damped air bearing as defined in claim 6 wherein the effective flow area of the amplifier output port pressurizes the moat without need for parallel small orifices or porous media which are sensitive to supply gas contamination.

9. The damped air bearing as defined in claim 1 further comprising three or more discrete amplifier-energized pressure pads on a single pad linear bearing assembly to allow for uniform lift and angular stability.

10. A damped air bearing for supporting a body in linear and rotating applications, comprising:
   a) a beam deflection proportional fluidic amplifier with a supply port pressurized from an external air pressure source and providing an amplifier supply jet, an output port supplying an amplifier output pressure, and a pair of input control ports;
   b) a bearing pad connected to the amplifier output port and pressurized by the amplifier output pressure to support said body on a film or layer of pressurized gas;
   c) a position sensor including a control orifice and a nozzle which cooperatively create a position feedback pressure indicative of the change in the gap between the bearing pad and body surface being supported;
   d) a passive fluidic compensation circuit connected to sense the position feedback pressure from the position sensor;
   e) a pneumatic compensation circuit operative to generate a differential pressure which varies with pad pressure and a change of position or velocity of the moving body in a direction perpendicular to the centerline of the nozzle;
   f) said compensation circuit being connected across the input control ports to cause a deflection of the amplifier supply jet and a change in amplifier output pressure as the supported body position and velocity changes.

11. The damped air bearing as defined in claim 10 further comprising at least three independent amplifier-energized pads located radially around a central axis of movement for the supported load.

12. The damped air bearing as defined in claim 11 in which said position sensors are located around a rotating shaft to sense the position of the shaft and control the amplifier output pressures to attenuate runout in the shaft.

13. The damped air bearing as defined in claim 10 in which the position feedback pressure is proportional to the change in the gap between the bearing pad and body surface being supported.

14. The damped air bearing as defined in claim 10 in which the position feedback sensor is offset radially from the centerline of the pressure pad to provide phase lead and additional damping in high speed rotating systems.

15. A damped air bearing for supporting a body in linear and rotating applications, comprising:
   a) a stack of machined laminates comprising:
      i) a beam deflection proportional fluidic amplifier with a supply port pressurized from an external air pressure source and providing an amplifier supply jet, an output port supplying an amplifier output pressure, and a pair of input control ports;
      ii) a bearing pad connectable to the amplifier output port for pressurizing by the amplifier output pressure to support said body on a film or layer of pressurized gas;
      iii) a sensor for sensing one of (1) the pressure in said bearing pad and (2) the position of the supported body with respect to the bearing pad, and for developing a pressure feedback indicative thereof; and
      iv) a pneumatic compensation circuit operative to generate a differential pressure which varies with the rate of change of the pressure feedback;
      v) said compensation circuit being connectable across the input control ports to cause a deflection of the amplifier supply jet and a change in amplifier output pressure as the pressure feedback changes; and
   b) wherein the stack of machined laminates are stacked together to present said bearing pad for supporting said body, and to establish said connections between the amplifier, the pad, the sensor, and the compensation circuit.

\* \* \* \* \*